Nov. 29, 1966     R. W. PRESS, JR     3,288,998

WALL STRUCTURE FOR A NUCLEAR REACTOR CONTAINMENT VESSEL

Filed Aug. 16, 1963

INVENTOR:
REECE W. PRESS, JR.
BY Howson & Howson
ATTYS.

United States Patent Office 3,288,998
Patented Nov. 29, 1966

3,288,998
WALL STRUCTURE FOR A NUCLEAR REACTOR CONTAINMENT VESSEL
Reece W. Press, Jr., Glassboro, N.J., assignor to United Engineers & Constructors Inc., Philadelphia, Pa., a corporation of Delaware
Filed Aug. 16, 1963, Ser. No. 302,597
1 Claim. (Cl. 250—83.3)

The present invention relates generally to the containment vessels for nuclear reactors and more specifically to a type of vessel adapted for enclosure of a nuclear power plant characterized by inner and outer walls having an evacuated, monitored air space between the inner and outer walls for the detection of incipent leakage of radioactive materials.

The possibility of a major nuclear accident occurring in a modern nuclear power plant is extremely small. However, the consequences of a serious malfunction could be devastating and it is accordingly standard practice in nuclear power plant design to enclose the reactor and all of the auxiliary facilities which handle or are involved with radioactive materals in a containment vessel. In vew of the economic necessity of locating such power plants within or near heavily populated areas where the power is utilized, it is of the utmost importance to provide a containment vessel which provides throughout the life of the structure a maximum degree of protection for personnel and property within the potential danger area.

There are two principal hazards to be considered in the design of a containment vessel. The first is the exposure of personnel at or near the plant site to direct gamma radiation from the radio active meaterials of a damaged reactor. The second hazard, and the more serious of the two, is the escape of gaseous or air-borne radioactive materials into the atmosphere to form a radioactive cloud which could affect populations located far from the malfunctioning unit.

It is a first object of the present invention to provide a containment vessel as a safeguard against both such hazards, which safeguard can be maintained in a leak-tight condition with the aid of a radiation detection monitoring system.

It is a further object of the invention to provide a containment vessel for a nuclear power plant which includes a partially evacuated air space within the walls of the vessel and extending over the entire wall area of the vessel, which air space may be continually monitored for leakage, any incipient leakage being detected and the cause corrected without danger of radioactive material reaching the atmosphere.

An additional object of the invention is to provide a containment vessel as described having inner and outer walls defining an evacuated, monitored air space, wherein any leakage passing through the inner walls is returned to the interior of the vessel, and cannot due to an adverse pressure differential pass through the outer wall into the atmosphere.

A still further object of the invention is to provide a containment vessel as described wherein a smooth inner wall of metal or other sheet material in contact with a pressed or molded dimpled sheet serves as a form for an outer wall of concrete or similar form-setting material, and inter-connected air spaces formed between the smooth and dimpled sheets providing the above-described monitored air space, the indentations of the dimpled sheet transmitting outwardly-directed stresses on the inner wall to the outer reinforced wall structure.

Still another object of the invention is to provide a containment vessel of economical construction.

Additional objects and advantgaes of the invention will be more readily apparent from the following detailed description of an embodiment thereof when taken together with the accompanying drawings in which.

Figure 1:
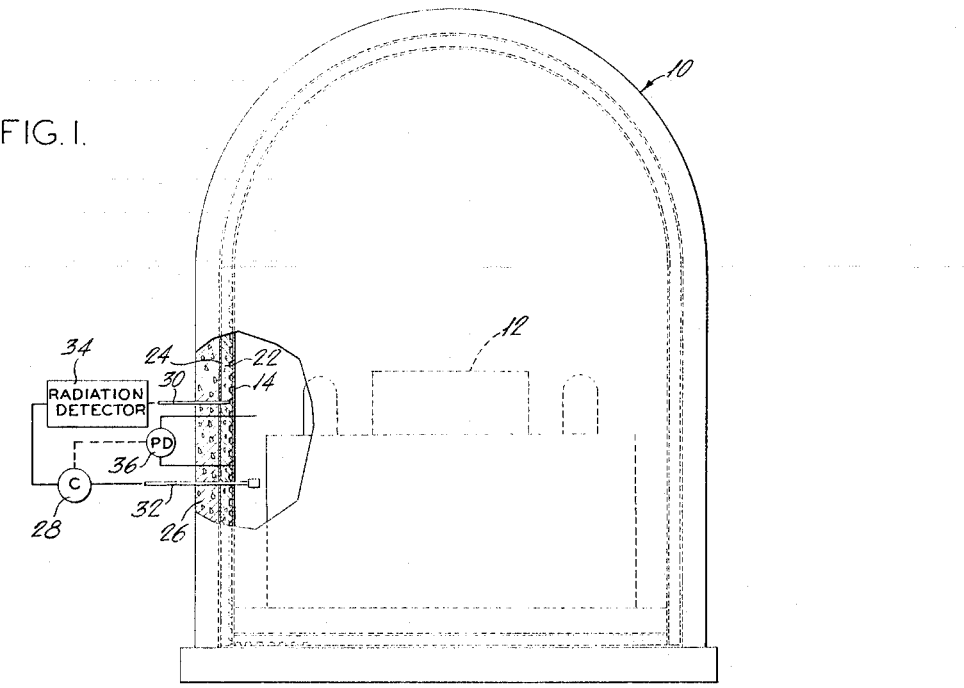
FIG. 1 is a schematic elevational view, partly in section, showing a containment vessel embodying the present invention and the manner in which evacuating means and monitoring controls are arranged.

Referring to FIG. 1 of the drawings, a containment vessel generally designated 10 embodying the present invention is shown enclosing a nuclear power plant 12 (schematically shown) including the reactor and other equipment involved with radioactive materials. In this instance, the containment vessel is shown having an upright cylindrical shape with a hemispherical dome and a flat base. Although other vessel shapes may be employed using the structural concepts of the invention, the illustrated vessel is characterized by a high percentage of usable space and exceptional structural strength and is thus a preferred vessel shape.

Figure 2:
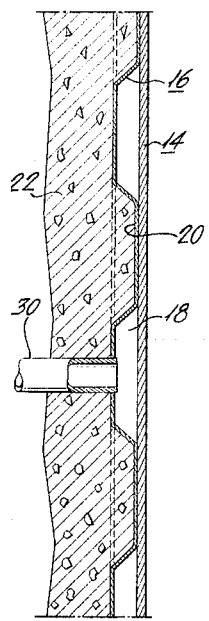
FIG. 2 is an enlarged partial sectional view of the containment vessel embodiment of FIG. 1 showing the details of the containment vessel wall construction.
Figure 3:
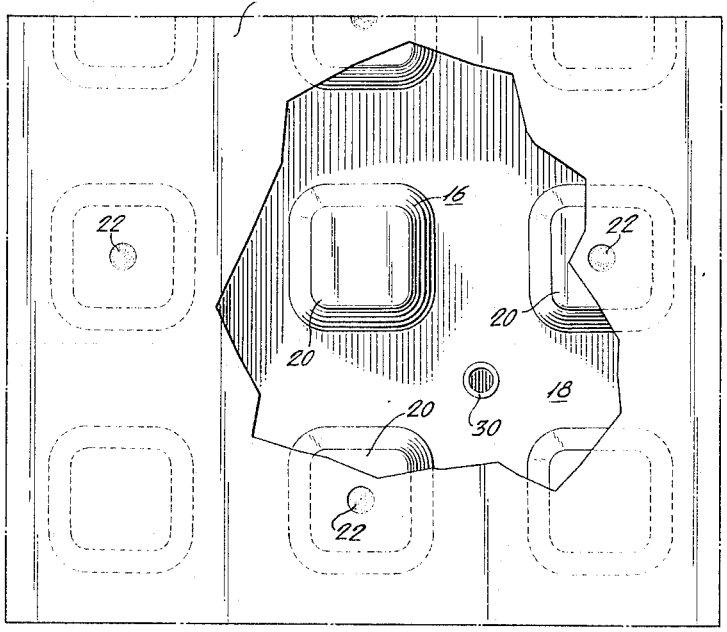
FIG. 3 is a partly cut away face view of the wall shown in FIG. 2 as viewed from the interior of the containment vessel.
Figure 4:
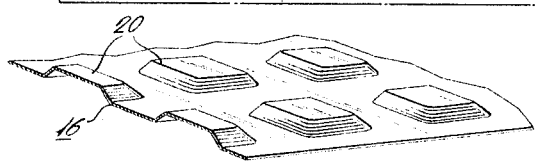
FIG. 4 is a perspective view of a portion of a dimpled sheet employed in contact with the inner wall to form the air space, showing the shape of the sheet indentations.

As shown in the enlarged view of FIG. 2, the walls including the floor of the vessel, comprise a smooth-faced, thin inner wall or diaphragm 14 of metal or similar sheet material which is welded or otherwise fabricated to provide a leak tight barrier. In contact with the outer face of the inner wall 14 is placed a dimpled pressed metal or molded plastic sheet 16, so formed that continuously connected passages 18 are created between the dimpled sheet and the inner wall, only the indentations 20 of the sheet 16 being in contact with the inner wall. In the illustrated embodiment, the dimpled sheet 16 is attached to the inner wall 14 by spot welding as shown in FIG. 3 at 22, both the dimpled sheet and inner wall in the embodiment being of a structural metal such as steel.

An outer wall of concrete is poured about the exterior of the dimpled sheet 16, the dimpled sheet serving essentially as a form to produce the desired continuously connected passages 18. In the embodiment shown, the outer wall consists of an inner concrete layer 22, an intermediate metal shell 24 and an outer reinforced concrete layer 26. Although the outer wall could consist of a single reinforced concrete layer, the arrangement, illustrated is preferred since the additional intermediate metal shell 24 provides further insurance against leakage through the outer wall. In addition, fabrication of the vessel is facilitated by such a construction since the intermediate shell and the inner wall with the dimpled sheet attached may be used as forms for pouring the inner concrete layer 22.

The continuously connected passages 18 in effect provide an air space surrounding the entire area of the inner wall including the floor. This air space is evacuated by a pumpback compressor 28 connected with the air space by means of conduit 30 passing through the outer wall and into the passages 18 in the manner shown in FIG. 2. The contents of the air space are pumped inside the vessel through the conduit 32 by the compressor 28. A radiation detector 34 in the conduit 30 continually monitors the flow through the conduit for radioactive leakage.

Leak detection is also accomplished by means of a pressure detection device 36 which through pressure sensing elements inside of the vessel, within the air space, and the pumpback compressor, can detect pressure changes indicative of leakage.

During operation of the power plant elements 12, the air space formed by the continuously connected passages 18 is maintained in a continuously evacuated state by the pumpback compressor 28. The radiation detector 34 provides a continuous check against radioactive leakage into the air space. Since the air pressures within the vessel and within the surrounding air space should be relatively constant, pressure fluctuations as noted by the pressure detection device 36 provides an additional indication that leakage is taking place.

Since the air space defined by the passages 18 is below the atmospheric pressure surrounding the containment vessel, any leakage which should pass into the air space would not, due to the adverse pressure differential, pass through the outer wall, but would pass through the passages 18 to the conduit 30 wherein it would be detected by the radiation detector 34 and returned to the vessel by the pumpback compressor 28.

The shape of the indentations 20 of the dimpled sheet 16 may be varied as desired as long as continuously connected passages are provided, and the indentations provide sufficient structural support for the inner wall 14. The preferred shape of the indentations as shown comprises a square or rectangular flat faced configuration which results in a waffle-like appearance of the dimpled sheet. Other shapes can be used provided that they have flat contacting bearing faces. The flat bearing faces of the indentations shown provide a firm support for transmission of outwardly directed forces from the inner wall to the outer reinforced wall and in addition are readily adapted for the attachment of the inner wall to the dimpled sheet such as by the spot welding technique presently employed. To provide the maximum support for the inner wall, the area of the flat faces of the indentations may constitute for example as much as 50% or more of the surface area of the dimpled sheet.

It can thus be seen that by use of a containment vessel as set forth in the present invention, in the event of a mechanical failure or nuclear accident in a contained power plant, all of the radioactive material will be confined to the vessel and will not contaminate the surrounding area. Any leakage which might take place can be detected and corrected while the leakage is still on a small scale. Any such leakage is collected and returned to the interior of the containment vessel before it can permeate the concrete outer wall and escape to the atmosphere. The wall structure of the invention is adaptable to containment vessels of practically any shape in view of the flexibility of the dimpled sheet and considering the degree of protection provided in a relatively inexpensive method of construction.

Should location of a reactor in a heavily populated district or other circumstances require that additional precautionary measures be adopted, the evacuated air space concept carried out in the manner of the present invention can be duplicated, for example at the inner surface of the intermedite metal shell 24, thus providing an additional safeguard against leakage.

Manifestly, changes in details of construction can be effected by those skilled in the art without departing from the spirit and the scope of the invention as defined in and limited solely by the appended claim.

I claim:

A wall structure for a nuclear reactor containment vessel comprising a gas-tight inner wall, a dimpled sheet adjacent the outer surface of said inner wall forming continuously connected passages therebetween, said dimpled sheet including a plurality of spaced indentations having flat surface faces engaging the outer surface of said inner wall, a substantially gas-tight outer wall in contiguous conforming relation with said dimpled sheet, said continuously connected passages defining an air space extending around the entire area of said inner wall, and means connecting with said air space for detecting leaks in said inner wall.

References Cited by the Examiner

UNITED STATES PATENTS

| 2,602,323 | 7/1952 | Leemhuis | 52—303 |
| 2,995,505 | 8/1961 | Guild | 250—108 |
| 3,016,463 | 1/1962 | Needham | 250—108 |
| 3,084,254 | 4/1963 | Goupil | 250—83.6 |

FOREIGN PATENTS

| 1,109,278 | 6/1961 | Germany. |
| 897,388 | 5/1962 | Great Britain. |

OTHER REFERENCES

Nucleonics News of the Month, vol. 21, No. 1 pages 17 and 18, vol. 21, No. 2 pages 17 and 18, Nucleonics January 1963 and February 1963, respectively.

RALPH G. NILSON, *Primary Examiner.*

J. W. LAWRENCE, A. R. BORCHELT,
*Assistant Examiners.*